United States Patent [19]
Hazen et al.

[11] 3,857,919
[45] Dec. 31, 1974

[54] SEPARATING METAL VALUES BY SELECTIVE EXTRACTION

[75] Inventors: Wayne C. Hazen, Denver; Pablo Hadzeriga, Arvada, both of Colo.

[73] Assignee: Molybdenum Corporation of America, New York, N.Y.

[22] Filed: June 18, 1969

[21] Appl. No.: 855,792

Related U.S. Application Data

[63] Continuation of Ser. No. 657,580, Aug. 1, 1967, abandoned.

[52] U.S. Cl............................ 423/9, 423/8, 423/10, 423/21, 423/23, 423/54, 423/63, 423/73, 423/99, 423/139, 423/263, 75/101 BE
[51] Int. Cl............................................ B01d 11/04
[58] Field of Search............ 23/339, 340, 341, 309, 23/310, 311, 312; 423/8, 9, 10, 21, 23, 54, 63, 73, 99, 139

[56] References Cited
UNITED STATES PATENTS
3,110,556 11/1963 Peppard et al........................ 23/312

OTHER PUBLICATIONS

Jamrack, Rare Metal Extraction by Chemical Engineering Techniques, Vol. 2, MacMillan Co., N.Y., 1963, pp. 181 to 184.

Elgin et al., Chemical Engineers Handbook, John H. Perry, 1950, Section II, Solvent Extraction, pp. 713 to 718.

Rice et al., Amines in Liquid-Liquid Extraction of Rare Earth Elements, Bureau of Mines Report of Investigations, 5923, 1962, pp. 1 to 14.

Primary Examiner—Leland A. Sebastian
Attorney, Agent, or Firm—Morgan, Finnegan, Durham & Pine

[57] ABSTRACT

Double solvent extraction process wherein an aqueous solution of difficult to separate metals is alternately contacted with two different solvents and at least one metal is preferentially extracted by the one solvent and at least one other metal is preferentially extracted by the other solvent.

8 Claims, 4 Drawing Figures

DOUBLE SOLVENT EXTRACTION

SINGLE SOLVENT EXTRACTION

STREAMS

⟵——— AQUEOUS
⟸=== AMINE SOLVENT
⟸--- DIALKYL PHOSPHATE SOLVENT

SEPARATING METAL VALUES BY SELECTIVE EXTRACTION

This application is a continuation of copending application Ser. No. 657,580, filed on Aug. 1, 1967, and now abandoned.

The present invention relates to a process for the selective solvent extraction, separation and recovery of metal values in an aqueous feed solution which comprises alternately contacting an aqueous feed solution with two different solvents each of which selectively extracts different metals in the aqueous feed solution.

The present invention relates to a double solvent extraction process adapted to the treatment of an aqueous solution containing therein values of difficult to separate metals. The present invention is specifically adapted to separation and recovery of the rare earth metal values from an aqueous solution thereof.

Considerable efforts have been expended by the art on the employment of solvent extraction techniques to separate and recover metal values from aqueous solutions. A large portion of the effort has been directed toward improving solvent selectivity, and in consequence, a considerable body of background knowledge exists on the many solvents which have been suggested for this purpose. Thus distribution coefficients under varying conditions are known for many aqueous mixed metal solutions with numerous solvents.

The separation factor for different metals deviates significantly one from the other in different solvent solutions. The separation factor may be defined as the ratio of the distribution coefficients (K) between the metals in the aqueous solution. Thus as applied to rare earth separation it has been found (Peppard et al., J. Inorg. Nucl. Chem 4,334, 1957) that Di-2-ethyl hexyl phosphoric acid (HDEHP) preferentially extracts the compounds of the higher atomic number (heavy) elements in the rare earth series. Throughout the lanthanide series, the separation factor ($r$) is equal to approximately 2.5. This may be expressed according to the following formula:

$$r = K_{z+1}/K_z = 2.5 \quad (1)$$

where $r$ equals separation factor; K equals distribution coefficient (concentration of given element in the organic phase divided by its concentration in the aqueous phase); $z$ is equal to the atomic number of one metal and $z+1$ is equal to the atomic number of the other metal.

Elsewhere it has been reported that primary amine solvents extract the compounds of the light (lower atomic number) rare earths more strongly than heavy ones with average separation factor for the lanthanide series of 1.5, i.e.:

$$r = K_z/K_{z+1} = 1.5 \quad (2)$$

Each of the above formulae (1) and (2) may be employed to calculate a value for the distribution coefficient K for any element $K_{z+1}$ if a value is determined for the first element $K_z$.

In accordance with the present invention, for example, when an aqueous solution of mixed rare earth metal values is alternately subjected to extraction with an organic alkyl phosphate solvent and with a primary aliphatic amine solvent, the overall result is that the phosphate will extract preferentially the heavy elements, the amine solvents will preferentially extract the light elements with the middle weight elements being left behind in the aqueous raffinate.

The separation factor $r_1$ for the solvent chosen to be selective for a particular metal relative to at least one other metal in the solution must be at least greater than 1.

The separation factor $r_2$ for the solvent chosen to be selective for a second metal relative to the first metal in the solution must be at least 1 and preferably greater than 1.

The separation of at least two difficult to separate metals can be carried out in an aqueous system in accordance with the present invention using two solvents where the separation factor of one of the solvents for the selected metal is more than 1 and the separation factor for the second solvent for the other metal is one or more than one. The higher the separation factors for the respective solvents and the respective selectively extracted metals, the better the separation.

In accordance with the present invention an aqueous feed solution containing difficult to separate metals can be treated to effect the desired separation of the metals by a process which comprises contacting and mixing the aqueous feed solution with a first immiscible solvent which exhibits a degree of selectivity for at least one of the metals in the feed solution allowing the mixture to separate into a solvent phase and an aqueous phase, said aqueous phase being depleted in the selected metal and said solvent phase being enriched in the selected metal, withdrawing the aqueous phase and contacting and mixing said aqueous phase with a second immiscible solvent which is selective for at least one of the other metals in said aqueous feed solution allowing said mixture to settle into an aqueous and solvent phase, said aqueous phase being depleted in said selected metal and said solvent phase being enriched in said selected metal and subsequently alternately contacting said aqueous feed solution with the first solvent and the second solvent until the desired degree of separation of the metals in the aqueous feed solution has been accomplished.

Each of the solvents enriched in the selected metal is called an extract phase and the aqueous solution remaining after the desired degree of extraction is carried out is called the raffinate phase. Each solvent phase is concentrated in the metal for which it is selective and the aqueous raffinate phase in a proper case is concentrated in the metals for which neither solvent shows a high degree of selectivity.

The extracted metals in each of the solvents can be recovered by stipping the solvents with an appropriate aqueous stripping solution and the stripped solvents returned to the process. The separated metals can be concentrated for example, by merely evaporating the stripping solution.

The process of the present invention provides substantially improved separations with a greatly reduced number of required extraction stages than would be required using a single solvent. The important feature of the present invention is the high degree of separation obtained with relatively few extraction stages, the overall recovery or yield of a specific metal in an aqueous feed solution being treated is of secondary importance and can be increased if desired by merely recycling the aqueous raffinate solution to the feed solution. In a proper process three products can be recovered: one concentrated in the first solvent, the second concentrated in the second solvent and the third product concentrated in the aqueous raffinate.

Many of the modern mining and metallurgical procedures can be carried out to produce suitable aqueous metal feed solutions for the present process. The present invention as has been previously pointed out, has application to the separation of difficult to separate metals. The process of the present invention has specific application to the separation of rare earth metal values from an aqueous solution of rare earth metals. this process can be used to obtain a first solvent fraction concentrated in light rare earth values, a second solvent fraction concentrated in heavy rare earth values, and an aqueous raffinate fraction concentrated in the middle weight rare earth values. In a similar manner by adjusting the extraction conditions, separations of relatively pure single rare earth metals can be obtained.

Further, the process also has specific and advantageous application to the separation of other difficult to separate metals in aqueous solutions of the metal. For example, certain mixtures of difficult to separate metals commonly occur in conventional mining and metallurgical processes. Aqueous solutions of metals containing significant amounts of mixtures of the following pairs of metals are suitable feed solutions for the present process to separate the metals from each other: vanadium and uranium; hafnium and zirconium; molybdenum and tungsten; zinc and copper; cobalt and nickel; and columbium and tantalum.

The solvents to be used must be immiscible or substantially immiscible with the aqueous metal solution to be treated. This avoids loss of solvent to the raffinate and also avoids contamination of the solvent stripping solution by the aqueous feed solution. The solvents must show a degree of selectivity for the metal it is chosen to selectively separate from the other metals in the aqueous feed solution.

There are two broad classes of solvents which under prescribed conditions have exhibited the desired degree of selectivity necessary to separate certain metals from other metals in aqueous solutions containing the metals.

The first class of solvents comprises primary, secondary, tertiary and quaternary amines which exhibit selectivity for certain metals. Specific amines that are useful are trioctylamine, dodecylamine, and Primene JM-T (Rohm & Haas) which is described as mixture of tertiary alkyl primary amine isomers having 18–21 carbon atoms, and the like.

The second class of solvents comprises alkyl phosphates, i.e., organic esters of phosphoric acids which exhibit a degree of selectivity for certain metals dissolved in an aqueous mixture of metals. Specific alkyl phosphates which can be used are tributyl phosphate, dodecyl phosphoric acid, tri-n-butyl orthophosphate, and di-2-ethyl hexyl-orthophosphoric acid (HDEHP), and the like.

The solvents can be used alone or with suitable inert diluents which diluents are also immiscible with the aqueous feed solution undergoing treatment. The solvents are commonly used with hydrocarbon diluents such as xylene, toluene and kerosene.

For example, a suitable alkyl phosphate solvent could comprise a 10% by volume solution of the selected alkyl phosphate in xylene.

In carrying out a particular separation, in accordance with this invention, it is not necessary to use an alkyl phosphate solvent and an amine solvent since two amine solvents or two alkyl phosphate solvents can be used providing that the solvents selected show a relative degree of selectivity for at least one of the metals in the solution relative to at least one other metal in the solution.

The number of stages of extraction used can, for example, be 3 to 12 alternating first with one solvent and then with the other solvent. Depending on the particular aqueous feed solution being treated and the desired degree of separation, 4 to 10 stages of separation can be used. It is noted, however, that more than 12 stages of extraction can be used, for example, if it is desired to obtain a substantially pure single rare earth element in either or both of the solvents and/or in the aqueous raffinate.

In one embodiment of the present invention, two solvent extraction circuits are used in parallel with one solvent in one circuit and a second solvent in another. Fresh solvent can be used in each extraction stage in each circuit or the same portion of solvent can be used in each circuit and contacted counter-currently with the feed in each circuit. The aqueous solution containing the metal values therein will crisscross so to speak between the two solvents thereby subjected to alternate extraction by the solvents. As applied in a preferred embodiment to separation of rare earths employing amine solvents and alkyl phosphates solvents there will result an amine solvent rich in the light rare earth elements and a phosphate solvent rich in the heavier rare earth elements and, frequently, an aqueous raffinate which may contain a single middle weight rare earth.

In accordance with a preferred embodiment the two solvent extraction circuits are operated in parallel with an amine containing solvent advancing countercurrently to the aqueous feed in one circuit and the alkyl phosphate solvent advancing countercurrently in the aqueous feed in the other circuit. The aqueous solution containing the rare earths or other metal compounds passes in a countercurrent flow pattern back and forth between the two circuits being subjected to extraction alternately by the amine solvent and phosphate solvent, thereby producing ultimately the amine solvent rich in light rare earths and the phosphate solvent rich in the heavy rare earths. By suitable adjustment of operating conditions it is possible to obtain in the aqueous raffinate a concentrated solution of a particular rare earth.

For further understanding of the present invention reference is now made to the attached drawings wherein.

Figure 1:
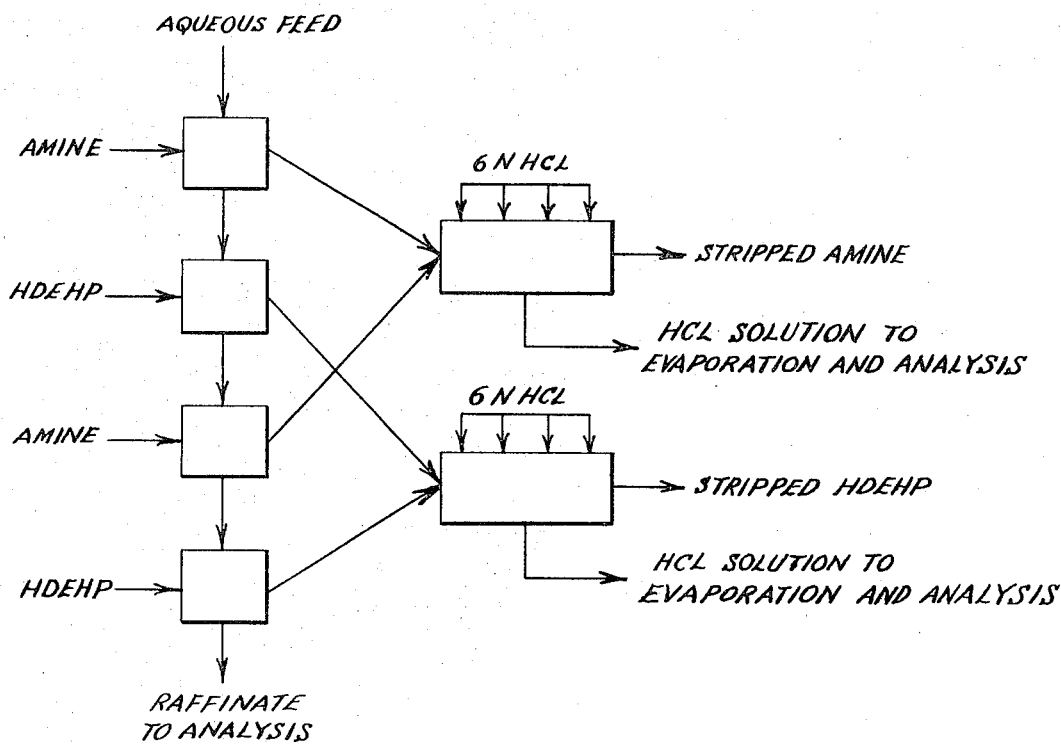
FIG. 1 is a flow sheet showing an elementary form of double extraction using two solvents and two extraction stages for each solvent, combining the extracts obtained by the respective solvents and stripping the combined extracts to recover the extracted metals.

While legends placed on the drawings make them virtually self-explanatory, it may be noted from FIG. 1 that the basic procedure for double extractive separation of mixed metal values in an aqueous solution comprises a flow pattern wherein the aqueous solution passes successively in alternating contact with a first solvent, then a second solvent, then the first solvent. Usually a repeated contact with the second solvent is carried out. If desired, the entire sequence may be repeated. According to the mode of FIG. 1, fresh solvent may be employed in each extraction contact stage whereas in FIGS. 3 and 4 the same solvent is used in each extraction stage in each circuit.

Figure 3:
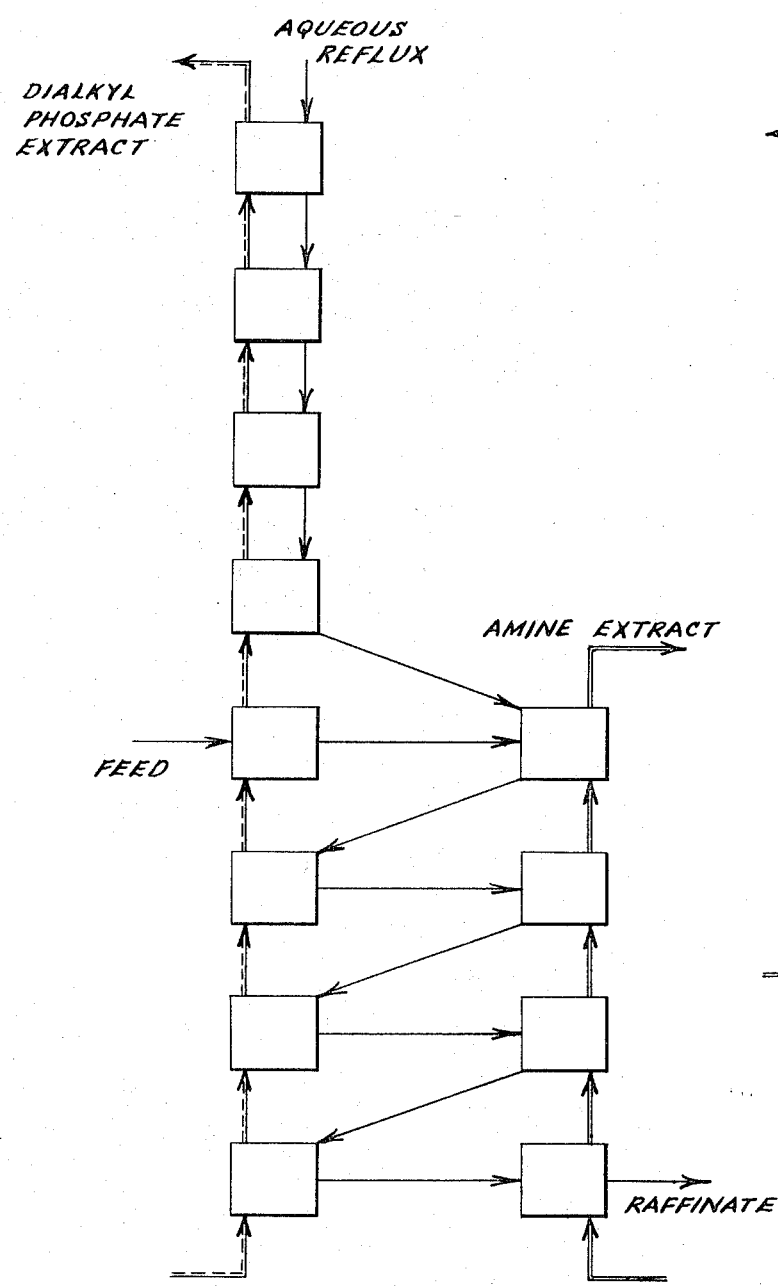
FIG. 3 is a flow sheet showing one preferred double extraction arrangement, using two solvents and countercurrent flow of the solvents and aqueous feed with reflux of the alkyl phosphate solvent extract.
Figure 4:
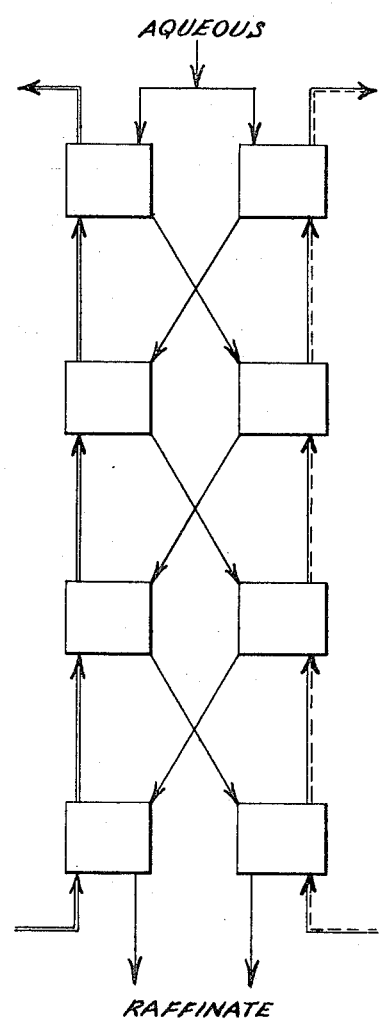
FIG. 4 is a flow sheet showing a second preferred double extraction arrangement using two solvents wherein the aqueous feed is split into two portions and alternately counter-currently contacted with each of the solvents.

Preferably, a countercurrent flow pattern is employed wherein the aqueous solution e.g., FIGS. 3 and 4, passes in a countercurrent flow pattern, successively alternating with a first solvent and then with a second solvent, so that the fresh first solvent becomes successively enriched in some of the metal values as it passes through the system, and the second solvent becomes successively enriched in other of the metal values as it passes through. Also as mentioned above with respect to FIG. 3, an aqueous reflux may be employed on one or both solvent streams to improve the degree of selectivity.

FIG. 4 illustrates what may be termed a "shoe lace" pattern wherein the aqueous feed stream is split, then crisscrosses in alternating passage from the first solvent to the second solvent.

To further illustrate the present invention, with respect to the separation of rare earth values from an aqueous solution thereof, the following specific examples are presented. A primary aliphatic amine solvent which preferentially extracts the light rare earth values is used as one of the solvents and an alkyl phosphate solvent which preferentially extracts the heavy rare earth values is used as the other solvent.

It is difficult to compare the conventional solvent extraction systems which use only one solvent with the present invention. In the former, one organic solvent and one aqueous solution are used and it yields only two products: an organic extract and the aqueous raffinate. In the present invention the use of two solvents results in three products, i.e., two solvent extracts and an aqueous raffinate.

EXAMPLE 1

An aqueous solution of rare earth and yttrium sulfate was used in these tests. The composition in mg of element per liter of the main constituents was as follows:

| Element | mg/l |
| --- | --- |
| Pr | 390 |
| Nd | 2620 |
| Sm | 7490 |
| Gd | 2430 |
| Dy | 370 |
| Y | 340 |
| | 13,640 |

This aqueous feed solution was adjusted to pH 1.5 using sulfuric acid.

The amine solvent selected comprised a mixture of isomers of tertiary alkyl primary amines having 18–21 carbons (Primene JMT, from Rohm and Haas Company). A solution of 10% by volume of this amine was prepared using kerosine as diluent. This solution was equilibrated to pH 1.5 using aqueous sulfuric acid, thereby converting the free amine to its sulfate salt.

The alkyl phosphate solvent was a 10% by volume solution of di-2-ethyl hexyl-orthophosphoric acid (HDEHP) in xylene.

In order to compare the efficiency of using these two solvents in a crosscurrent manner in accordance with the present invention as opposed to using only one solvent, three tests were run using a standard separatory funnel. Mixing time of aqueous feed and solvent was about 1.5 minutes and phase ratio was maintained at 1.0 throughout these tests, i.e., equal volumes of aqueous feed and solvent were used in each extraction stage.

Test 1

Figure 2:
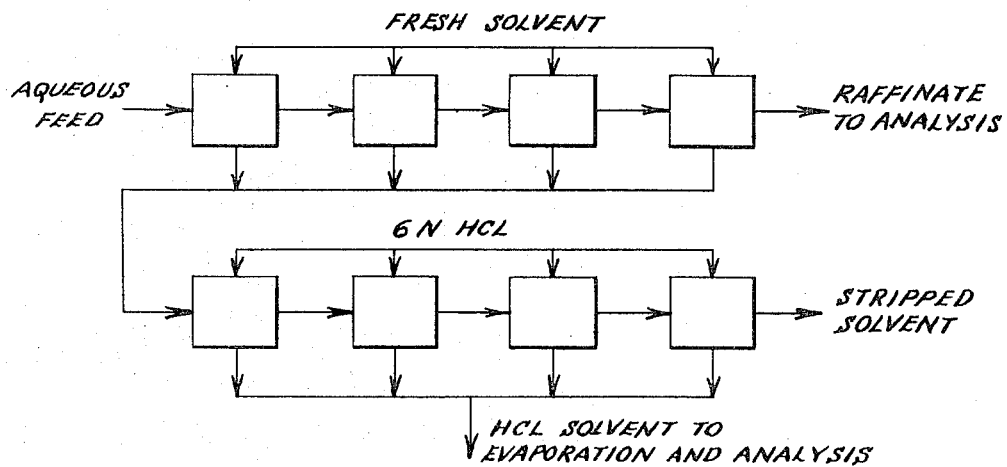
FIG. 2 is a flow sheet showing a conventional multiple single solvent extraction employed for comparative purposes using fresh solvent in each stage and followed by stripping of the extract to recover the extracted metal values.

Four crosscurrent stages were used following the procedure generally illustrated in FIG. 2 of the drawings. 50 ml. of aqueous feed solution was contacted successively with four equal volumes of the amine solution. The final aqueous phase constituted the raffinate. The four amine extracts were combined and stripped four times with 50 ml. of 6 N hydrochloric acid. Raffinate and re-extract were processed and analyzed using an X-ray flourescence technique.

Test 2

This test was similar to Test 1, but the alkyl phosphate solvent was used instead of amine.

Test 3

Following the procedure generally illustrated in FIG. 1 of the drawings, 50 ml. of aqueous feed solution was contacted with two stages of amine and two stages of HDEHP extraction used alternatively in a crosscurrent manner. The two amine extracts as in Test 1 were combined and stripped. The same was done with the two HDEHP extracts.

The results obtained in these three tests were expressed as variations of the weight ratios of the main elements and are shown in Table 1.

Table 1

| | | Weight Ratio in Extracts | | |
| --- | --- | --- | --- | --- |
| | | Sm/Gd | Sm/Dy | Gd/Dy |
| | Feed Solution | 3.08 | 20.2 | 6.57 |
| Test 1: | 4 Stages Amine alone | 3.28 | 24.0 | 7.32 |
| Test 2: | 4 Stages HDEHP alone | 1.30 | 6.97 | 5.37 |
| Test 3: | Alternatively 2 Amine Stages)Amine Ext. | 5.31 | 70.6 | 13.3 |
| | and 2 HDEHP Stages)HDEHP Ext. | 0.85 | 2.19 | 2.56 |

With this 4-stage crosscurrent extraction, the advantage of using two solvents over a single solvent for the separation of rare earth elements can be seen. For example, in the pair Gd/Dy, it is evident that in extracting with any one solvent alone, little or nothing is gained in only four stages. With two solvents used alternatively, the concentration ratio is almost double in the amine extract, while it is less than one-half as great in the HDEHP extract as compared with the aqueous feed.

EXAMPLE 2

This example illustrates how an improved separation can be obtained using the process of the present invention as compared with using a single solvent and how a particular rare earth metal value can be concentrated in the aqueous raffinate.

Using as in Example 1 50 ml. of the same aqueous feed and the same solvents and a similar procedure to that used in Example 1, two tests were run. In one test, three stages of crosscurrent extraction with amine solvent were made on the same aqueous solution. In the other, two stages of amine with an intervening stage of alkyl phosphate were performed. The analyses of the several extracts and raffinates obtained are summarized in Table 2.

Table 2

Three Stage Crosscurrent Solvent Extraction

| Aqueous Feed | | Single Solvent | | | | Double Solvent | | | | | |
|---|---|---|---|---|---|---|---|---|---|---|---|
| | | Amine Extract | | Raffinate | | Amine Extract | | HDEHP Extract | | Raffinate | |
| mg. | % Purity | mg. | % Purity | mg. | % Purity | mg. | % Purity | mg. | % Purity | mg | % Purity |
| Pr 390 | 2.9 | 275 | 3.1 | 115 | 2.5 | 280 | 3.4 | 2 | 0.2 | 108 | 2.7 |
| Nd 2620 | 19.2 | 1600 | 17.7 | 1020 | 22.1 | 1930 | 23.4 | 36 | 2.6 | 654 | 16.3 |
| Sm 7490 | 54.9 | 5230 | 58.0 | 2260 | 48.8 | 5020 | 60.8 | 320 | 23.4 | 2150 | 53.4 |
| Gd 2430 | 17.8 | 1540 | 17.1 | 890 | 19.2 | 940 | 11.4 | 500 | 36.5 | 990 | 24.6 |
| Dy 370 | 2.7 | 230 | 2.5 | 140 | 3.0 | 55 | 0.7 | 300 | 21.9 | 15 | 0.4 |
| Y 340 | 2.5 | 140 | 1.6 | 200 | 4.3 | 25 | 0.3 | 210 | 15.4 | 105 | 2.6 |

It can be seen from the data in Table 2 that with a single stage of HDEHP between two amine stages, the double solvent system has improved the purity in both extremes of the series as compared with using three stages of amine: better purity of Pr, Nd and Sm in the amine extract and better purity of Gd, Dy and Y in the HDEHP fraction. The corresponding recoveries may be calculated from the values given in table 2. This shows that the recovery of Pr, Nd and Sm in the amine fraction is about equal in the single and the double solvent systems. However, there is a considerable drop in the recovery of Gd, Dy and Y in the two amine stages for the double solvent system.

An important fact worth noting is that the total Gd extracted in three amine stages is 63.4%, while with the double solvent system the total Gd extracted is 59.3% (38.7% by the two amine fractions plus 20.6% by the HDEHP fraction). Though the above system shows a substantial increase in the concentration of the Gd in the raffinate as compared with the aqueous feed solution, it is evident that in the proper system, and with enough stages, the double solvent system will show a substantially greater concentration of Gd in the raffinate than shown in this example.

The process of the present invention can thus be used to advantage to selectively separate light and heavy rare earth values from an aqueous feed solution to recover desired middle rare earth values such as Gd in the aqueous raffinate.

The process of the present invention has distinct and advantageous uses in obtaining a high degree of separation of difficult to separate metals in aqueous solutions. The important characteristic of the process of the invention is the ability of the process by using two solvents each immiscible with the feed solution and each selective for a particular metal to obtain in a relatively few stages of extraction a higher degree of separation of the metals than can be obtained using either solvent separately and using substantially more stages of extraction.

The invention has many obvious applications in the mining industry and the metallurgy industry to separate metals which can be put in aqueous solution and to recover heretofore difficult to separate metals economically and in commercially useful amounts.

The invention is not to be limited by the above description or examples which are given merely as illustrative. the scope of the invention is to be interpreted by the appended claims.

We claim:

1. A process for separating rare earth metal values in an aqueous solution containing said metals which comprises contacting and mixing said aqueous solution with a first immiscible organic solvent which selectively extracts at least a first rare earth metal from the metals in the aqueous solution, allowing the mixture to settle into an aqueous phase depleted in the first rare earth metal and a solvent phase enriched in said first rare earth metal, separating the aqueous phase from the solvent phase and then contacting said separated aqueous phase with a second immiscible organic solvent which selectively extracts at least a second rare earth metal from said aqueous phase, allowing the mixture to settle into an aqueous phase depleted is said second rare earth metal and a solvent phase enriched in said second rare earth metal, separating said aqueous phase and then contacting and mixing said separated aqueous phase with said first organic solvent which selectively extracts an additional amount of said first rare earth metal, allowing the mixture to separate into an aqueous phase depleted in said first rare earth metal and a solvent phase enriched in said first rare earth metal, separately stripping said first and second solvents to recover a first stripping solution concentrated in said first rare earth metal and a second rare earth metal, and separating a last aqueous phase depleted in both of said first and second rare earth metals.

2. A process for separating rare earth metal values in an aqueous feed solution containing said rare earth values which comprises contacting and mixing said feed solution with a first immiscible organic amine solvent which exhibits a selectivity for at least one of said rare earth metals, separating a solvent phase and an aqueous phase, contacting and mixing separated aqueous phase with a second immiscible organic phosphate solvent which exhibits a selectivity for at least one other of said rare earth metals, separating an aqueous phase and a solvent phase, alternately contacting said aqueous phase with said first solvent and with said second solvent to selectively extract into the respective solvents the metal values for which said solvents are selective and to thereby separate said rare earth values in said feed solution into said respective solvents, separating said metals from said solvents and recovering said metals.

3. A double solvent extraction process for the separation of rare earth metal values from an aqueous solution containing said rare earth metals which comprises:
1. contacting the aqueous solution with a first immiscible organic amine solvent which has a separation factor of about 1.5 for the lower atomic number metal values, separating an aqueous phase and a solvent phase, and
2. thereafter contacting the aqueous phase with a second immiscible organic phosphate solvent which has a separation factor of about 2.5 for the higher atomic number metal values, separating an aqueous phase and a solvent phase,
3. then again contacting the aqueous phase with said first immiscible organic amine solvent, whereby said rare earth metal values are extracted from said aqueous solution preferentially into the two solvents, separating said metals from said solvents and recovering said metals.

4. The process of claim 3 wherein the alkyl amine solvent comprises a mixture of tertiary alkyl primary amines having 18 to 21 carbon atoms and the alkyl phosphate solvent comprises di-2-ethyl hexyl phosphoric acid.

5. A procedure for the solvent extraction of rare earth values present in an aqueous solution comprising successively contacting the aqueous solution with a first immiscible organic solvent containing an alkyl amine and subsequently contacting the aqueous solution with a second immiscible organic solvent containing an alkyl phosphate, then contacting the aqueous solution with said amine containing solvent whereby after each contact an aqueous phase and a solvent phase are separated and whereby the lower atomic number rare earth values are preferentially extracted into the alkyl amine solvent and the higher atomic number rare earth values are preferentially extracted into the alkyl phosphate solvent and the middle atomic number rare earth values selectively remain in the aqueous raffinate solution, separating the rare earth metals from said solvents and raffinate solution and recovering said metals.

6. A process for separating rare earth metal values in an aqueous feed solution containing Pr, Nd, Sm, Gd and Dy, and yttrium, which comprises contacting and mixing said feed solution with a first immiscible organic amine solvent which exhibits a selectivity for the lower atomic number rare earth metals, separating a solvent phase and an aqueous phase, contacting and mixing said separated aqueous phase with a second immiscible organic phosphate solvent which exhibits a selectivity for the higher atomic number rare earth metals and yttrium, separating an aqueous phase and a solvent phase, alternately contacting said aqueous phase with said first solvent and with said second solvent to selectively extract into the respective solvents the metal values for which said solvents are selective and to thereby separate said rare earth values and yttrium in said feed solution into said respective solvents, separating said metals from said solvents and recovering said metals.

7. The process of claim 6 wherein the rare earth metals Pr, Nd and Sm are concentrated in the amine solvent, the rare earth metal Dy, and the metal yttrium are concentrated in the organic phosphate solvent and the rare earth metal Gd is concentrated in the remaining aqueous phase.

8. A process for separating metals in an aqueous solution selected from the group consisting of solutions of vanadium and uranium; hafnium and zirconium; molybdenum and tungsten; zinc and copper; cobalt and nickel; and columbium and tantalum, said process comprising contacting and mixing said aqueous solution with a first immiscible solvent which selectively extracts at least a first metal from the metals in the aqueous solution, allowing the mixture to settle into an aqueous phase depleted in the first metal and a solvent phase enriched in said first metal, separating the aqueous phase from the solvent phase and then contacting said separated aqueous phase with a second immiscible solvent which selectively extracts at least a second of the metals in said aqueous solution, allowing the mixture to settle into an aqueous phase depleted in said second metal and a solvent phase enriched in said second metal, separating said aqueous phase and then contacting and mixing said separated aqueous phase with said first solvent which selectively extracts an additional amount of said first extracted metal, allowing the mixture to separate into an aqueous phase depleted in said first metal and a solvent phase enriched in said first metal, separately stripping said first and second solvents to recover a first stripping solution concentrated in said first metal and a second stripping solution concentrated in said second metal and a last aqueous phase depleted in both of said first and second metals.

* * * * *